United States Patent
Takehara et al.

[11] Patent Number: 5,938,910
[45] Date of Patent: Aug. 17, 1999

[54] ELECTROLYTIC MANGANESE DIOXIDE AND METHOD OF MANUFACTURING THE SAME

[75] Inventors: Hisao Takehara; Yoshihiro Nakayama, both of Chuo-Ku; Ryoichi Shimizugawa, Takaoka; Tsutomu Kishikawa, Takaoka; Takumi Murai, Takaoka; Fumiya Takahashi, Takaoka; Koh Takahashi, Tsukuba, all of Japan

[73] Assignee: Japan Metals & Chemicals Co., Ltd., Tokyo, Japan

[21] Appl. No.: 08/921,370

[22] Filed: Aug. 29, 1997

Related U.S. Application Data

[62] Division of application No. 08/574,927, Dec. 19, 1995, Pat. No. 5,746,902.

[30] Foreign Application Priority Data

Dec. 26, 1994 [JP] Japan .................................. 6-337115

[51] Int. Cl.⁶ .................................................. C01G 45/02
[52] U.S. Cl. .............................. 205/51; 423/605; 429/224
[58] Field of Search .......................... 429/224; 423/605; 205/539, 57

[56] References Cited

U.S. PATENT DOCUMENTS

| | | | |
|---|---|---|---|
| 4,170,527 | 10/1979 | Beer | 205/342 |
| 4,405,419 | 9/1983 | Misawa | 205/352 |
| 4,818,354 | 4/1989 | Preisler | 205/352 |
| 5,352,339 | 10/1994 | Kozawa | 205/542 |
| 5,391,365 | 2/1995 | Wane et al. | 423/605 |
| 5,523,073 | 6/1996 | Sumida et al. | 423/605 |

FOREIGN PATENT DOCUMENTS

| | | |
|---|---|---|
| 57-42711 | 3/1982 | Japan . |
| 63-26389 | 2/1988 | Japan . |

*Primary Examiner*—K. Mayekar
*Attorney, Agent, or Firm*—Oliff & Berridge, PLC

[57] ABSTRACT

Electrolytic manganese dioxide having a BET specific surface area of less than 30 m²/g and a suspensiveness of less than 50 mg/liter is used for alkaline manganese batteries and manganese batteries to make them excellent both in initial performance and storability. The electrolytic manganese dioxide may be made by a suspension method or a clarification method.

4 Claims, 8 Drawing Sheets

(25°C x 300hr, 40wt% KOH solution, EMD/KOH solution = 1/1)

ELECTROLYTIC MANGANESE DIOXIDE AND METHOD OF MANUFACTURING THE SAME

This is a Division of application Ser. No. 08/574,927, filed Dec. 19, 1995, now U.S. Pat. No. 5,746,902.

BACKGROUND OF THE INVENTION

1. Field of the Invention

This invention relates to electrolytic manganese dioxide to be suitably used for alkaline, manganic and other batteries and a method of manufacturing the same. More particularly, the present invention relates to electrolytic manganese dioxide that can effectively improve the initial performance and the storability of batteries comprising the same and a method of effectively and efficiently manufacturing such electrolytic manganese dioxide on an industrial basis.

2. Prior Art

The overall performance of an alkaline or manganic battery heavily relies on its initial performance and storability. A battery of the type under consideration normally comprises an anodic composite, cathodic zinc, electrolyte, a separator and a collector. The anodic composite by turn normally comprises as principal components manganese dioxide, electroconductive materials and electrolyte. Electrolytically, naturally or chemically produced manganese dioxide can be used for the battery.

While the performance of a battery is a function of the performances of its individual components including manganese dioxide, the contents of the different components and other factors, it is of vital importance for a battery to contain manganese dioxide as much as possible as a component of the anodic composite within a limited space if an improved performance is required for the battery.

To meet the requirement of increasing the manganese dioxide content per unit volume of a battery, particularly in the case of electrolytic manganese dioxide to be used for the anodic composite, efforts are being made to optimize the average particle size and the distribution of differently sized particles of electrolytic manganese dioxide at a post-processing step in the process of manufacturing manganese dioxide by electrolysis. Commercially available batteries typically have a BET specific surface area (hereinafter referred to simply as BET, which is the surface area measured by the Brunauer, Emmett and Teller method) of about 30 to 50 $m^2$/g.

On the other hand, in order to improve the storability of a battery, it is essential to use electrolytic manganese dioxide that can effectively suppress generation of gas from the battery while it is being stored, does not significantly contain heavy metal impurities such as iron, lead and copper and is electrochemically active. From the viewpoint of storability of a battery, the average particle size of electrolytic manganese dioxide is also important. If the average particle size is too small, particles of manganese dioxide can become chemically unstable and deteriorated by the electrolyte in the battery while the latter is being stored. Although it is believed that electrolytic manganese dioxide is resistant against deterioration by the electrolyte particularly when the battery is an alkaline battery that is rechargeable for a limited number of times (or structurally a primary battery but can be recharged under certain conditions) and the electrolyte is an alkaline substance, much has to be done to technologically improve the quality of electrolytic manganese dioxide if it is used for batteries.

Known methods of manufacturing electrolytic manganese dioxide (hereinaftre referred to as EMD) include the suspension method (as disclosed in Japanese Patent Publications Nos. 57-42711 and 63-26389), the charge fluctuation method (as disclosed in Japanese Patent Publication No. 5-275054) and the clarification method. The operation of electrolysis is conducted with a current density of 1.0 to 4.0 A/$dm^2$ and an electrolytic temperature of 94 to 96° C. for the suspension method and with a current density of 0.4 to 0.9 A/$dm^2$ and an electrolytic temperature of 90 to 96° C. for the clarification method, the $H_2SO_4$ and $MnSO_4$ concentrations typically being 0.35 to 0.6 mol/liter and 0.5 to 1.2 mol/liter respectively for the both methods.

SUMMARY OF THE INVENTION

After a series of intensive research efforts, the inventors of the present invention succeeded in the development of high quality EMD showing an excellent initial performance and capable of being contained densely within a limited space of a battery and a novel method of manufacturing such EMD by using a low BET level and introducing a new norm of "suspensiveness".

More specifically, the inventors of the present invention found the following for EMD to be used for batteries.

(1) EMD can be densely contained within a given space of a battery if the BET is selected from a low value renge that has not been used for conventional batteries, however a BET value lower than 30 $m^2$/g is not commercially feasible because it requires an exceptionally low current density to reduce the productivity. This is particularly true for the clarification method.

(2) EMD manufactured by a method according to the invention is less susceptible of deterioration by alkali solution when the BET has a low value as will be described in greater detail hereinafter.

(3) EMD obtained by a method according to the invention may be effective for homogeneous solid reactions that can be observed in electric discharge systems based on the interstitial movement of protons and the movement of electrons as will be described in greater detail hereinafter.

(4) EMD having improved properties can be obtained by a method according to the invention where the current density and the electrolytic temperature are correlated in a specific way.

In short, the inventors of the present invention succeeded in the development of high quality EMD that is excellent in both initial performance and the storability by studying in depth the basic properties of EMD.

According to an aspect of the present invention, there is provided EMD having a BET specific surface area of less than 30 $m^2$/g and a suspensiveness of less than 50 mg/liter. Preferably, the BET specific surface area is less than 27 $m^2$/g and the suspensiveness is less than 50 mg/liter.

According to another aspect of the invention, there is provided a method of manufacturing EMD (hereinafter referred to as the suspension method) wherein electrolysis is conducted in an electrolytic bath under the conditions of suspending manganese oxide having an average particle size of less than 5 μm in the solution of the electrolytic bath by adding the oxide to the solution at a rate of 0.01 to 0.2 g/liter, and keeping, in the electrolytic bath solution, the sulfuric acid concentration between 0.40 and 0.55 mol/liter, the anodic current density between 0.4 and 3.0 A/$dm^2$, the electrolytic temperature between 93 and 103° C., and the relationship between the anodic current density and the electrolytic temperature to be expressed by $103 \geq y \geq 21.67x + 92.33$ (where x represents the anodic current density and y represents the electrolytic temperature)

According to still another aspect of the invention, there is provided a method of manufacturing EMD wherein electrolysis is conducted in an electrolytic bath under the conditions of suspending manganese oxide in an electrolytic bath solution and causing, the anodic current density to cyclically take two or more than two values within the range between 0.4 and 3.0 A/dm$^2$.

According to still another aspect of the invention, there is provided an alternative method of manufacturing electrolytic manganese dioxide without being suspended to (hereinafter referred to as the clarification method) wherein electrolysis is conducted in an electrolytic bath under the conditions of keeping, in the solution of the electrolytic bath, the sulfuric acid concentration between 0.30 to 0.45 mol/liter, the anodic current density between 0.4 and 0.9 A/dm$^2$, the electrolytic temperature between 94 and 103° C., and the relationship between the anodic current density and the electrolytic temperature to be expressed by $103 \geq y \geq 110.00x + 90.00$ (wherein x represents the anodic current density and y represents the electrolytic temperature).

EMD may be manufactured by a clarification method according to the invention, cyclically changing the anodic current density to show two, or more than two, different current levels.

Alternatively EMD may be manufactured by alternatively using a suspension method and a clarification method according to the invention.

DETAILED DESCRIPTION OF THE INVENTION

It should be noted that suspensiveness (mg/liter) is a new norm to be used in the manufacture of EMD proposed by the inventors of the present invention.

For the purpose of the present invention, the suspensiveness is determined in a manner as follows. A 10.000 g sample of EMD is mixed and caused to react with a 50 cc of aqueous solution containing caustic potassium by 40 wt %, stirring the mixture for twelve hours in a water bath of a 100 cc beaker at a temperature of 80° C. As a result of the reaction, the EMD becomes suspended in the aqueous solution in the form of fine particles by the degluing effect of caustic potassium. Thereafter, the suspended EMD is quantified, following the steps as described below.

After cooling the suspension to room temperature, it is diluted with 500 cc of pure water and stirred well. Thereafter, the diluted suspension is subjected to a primary filtering operation to separate fine particles by means of a paper filter (filter: JIS P 3801 type-5 B, circular with a diameter of 11.0 cm$\phi$; capable of holding particles as small as 4 $\mu$m in diameter). Subsequently, the retentate of the paper filter is washed with 20 cc of 4 wt % aqueous solution of KOH so that the washing aqueous solution and the filtrate are mixed. Only a single paper filter is used for the above operation. Then, the filtrate containing suspended particles is filtered with a glass fiber filter (filter: JIS K0120 for quantitative analysis of suspended substances; circular with a diameter of 5.5 cm$\phi$, capable of holding particles as small as 0.8 $\mu$m in diameter). If some suspended particles have slipped into the filtrate, the filtering operation should be repeated for a plurality of times.

The retentate of the filter is then caused to dry at 105° C. for about an hour and cooled in desiccator. Thereafter, the dried retentate is weighed to determine the suspensiveness S (mg/liter), using the formula below.

$$S = (a-b) \times 1000/V,$$

where a represents the weight (mg) of the filter holding the suspended substances and the watch glass, b represents the weight (mg) of the filter and the watch glass and V represents the volume (milliliter) of the mixed solution of the filtrate and the washing aqueous solution.

Figure 1:
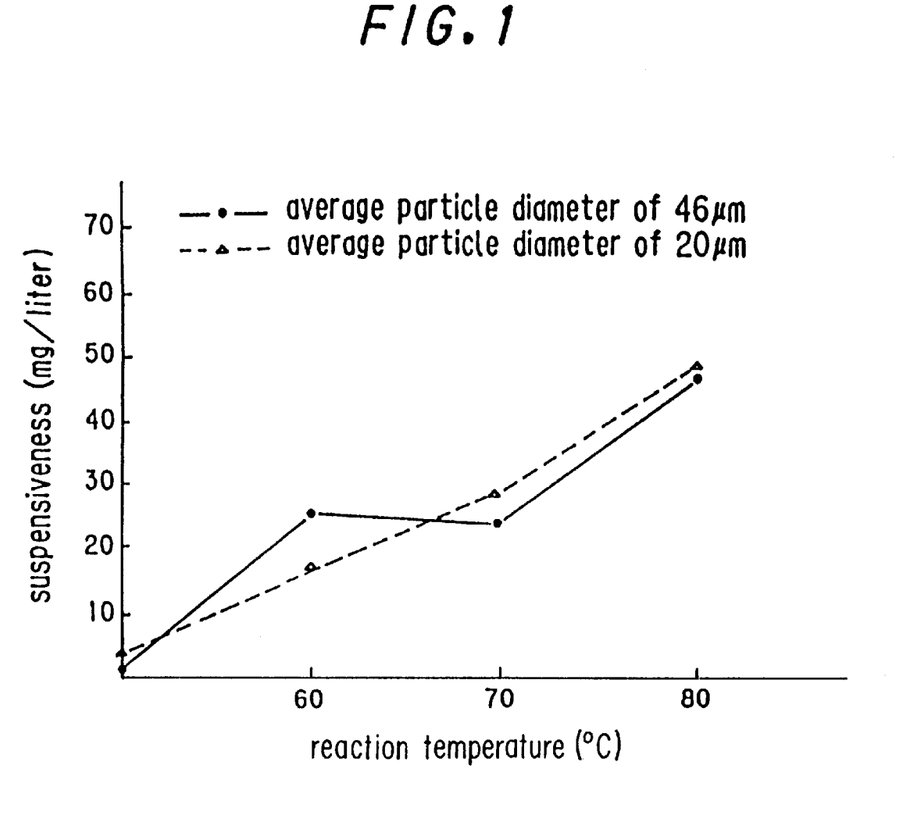
FIG. 1 is a graph showing the relationships between the reaction temperature and the suspensiveness observed for EMD with two different average particle diameters according to the invention.

As a result of research efforts for developing a method of manufacturing EMD, the inventors of the present invention came to realize that the reaction speed and the particle size of EMD are closely related to the suspensiveness and carried out a series of experiments to prove the correlations. FIG. 1 below illustrates the relationships between the reaction temperature and the suspensiveness observed in an experiment where EMD with two different average particle diameters was caused to react for twelve hours, EMD with an average particle diameter of 20 $\mu$m and EMD with that of 46 $\mu$m, the BET of EMD being commonly 30 m$^2$/g for both particle sizes.

Note that the average particle diamters of 20 $\mu$m and 46 $\mu$m are selected by taking the fact into consideration that an average particle diameter of EMD between 15 and 50 $\mu$m is typically observed for batteries.

As apparent from FIG. 1 above, the suspensiveness increases with the rise in the reaction temperature. From FIG. 1, it would be understood that the average particle size of EMD would not produce any significant difference in the influence on the suspensiveness if it is found within the above described range of EMD particle diameter.

In view of these, a temperature of 80° C. was adopted for the subsequent expreiments because it can give rise to a quick reaction in the presence of KOH solution. Also note that "blank" in FIG. 1 represents the suspensiveness of specimens prepared at predetermined procedures, for the purpose of comparison. The filtrates of the specimens appeared transparent without showing any sign of opacity.

Figure 2:
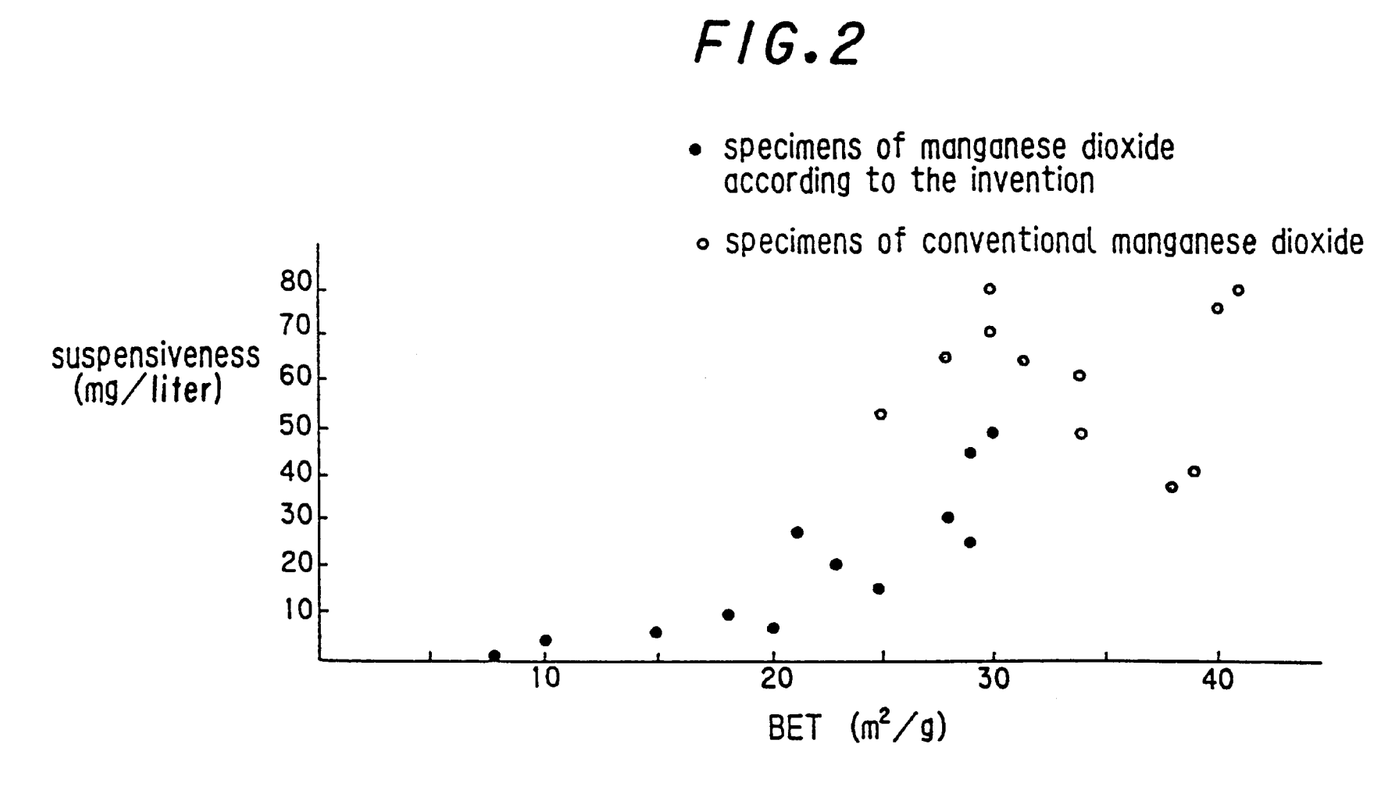
FIG. 2 is a graph showing the relationship between the BET and the suspensiveness of both particulate specimens of EMD according to the invention and those of conventional electrolytic manganese dioxide.

FIG. 2 below shows the relationship between the BET and the suspensiveness of both particulate specimens of EMD according to the invention and those of conventional electrolytic manganese dioxide. As seen from FIG. 2, the suspensiveness does not fluctuate significantly among EMD specimens as long as BET is held below 30 $m^2/g$, particularly below 27 $m^2/g$, whereas it comes to remarkably fluctuate over a wide range for a same BET value once the BET value exceeds 30 $m^2/g$. (BET was determined by using the BET one point technique and the $N_2$ adsorption method for the specimens that had been preliminarily heated to 120° C. for 15 minutes.)

The inventors assumes that the fluctuations in FIG. 2 can be explained because EMD at the a same BET value may react with KOH in various different ways depending on the bonding force among primary particles, the liquid substances contained in particles (such as the water of crystallization and the electrolytic solution remaining in crystalline particles) and other factors. While visible brown fine particles can pass through the paper filter when BET exceeds 35 $m^2/g$. depending on circumstances,it was found that, as described hereinafter by referring to examples, the storability of batteries using electrolytic manganese dioxide according to the invention degrades remarkably in the initial stages if the BET has a large value. The value of 50 mg/liter of suspensiveness as defined herein for the purpose of the present invention is obtained from the above observations.

Figure 3:
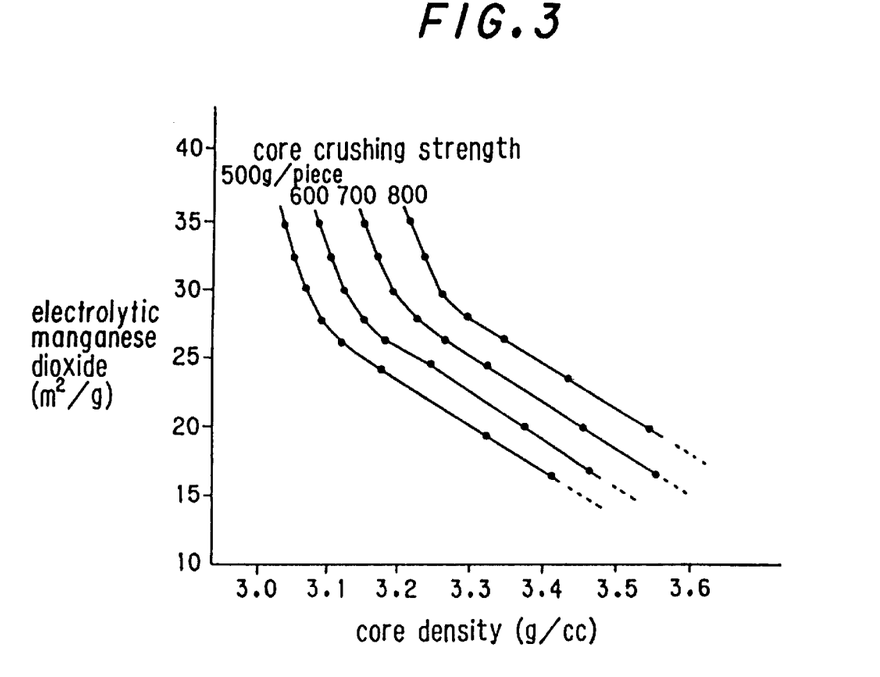
FIG. 3 is a graph showing the relationship between the BET and the core density of specimens obtained in a crushing test to determine the crushing strength.

In a subsequent experiment, the inventors mixed particulate EMD specimens having an average particle diameter of 40 to 45 μm and varied BET values with electrolytic solution, added an electroconductive substance thereto, and subjected the mixture specimens to a primary press operation using a roller compactor (output of 2.2 KW, roll diameter of 130 mm, roll width of 25 mm) to prepare evenly sized particles, which were then formed into cores (cylindrical profile with length of 13 mm, outer diameter of 13 mm and inner diameter of 8 mm) of LR6 alkaline manganese batteries by means of a tabletting machine (output of 2.2 KW, a capacity of producing 60 tablets/min.) for each particulate specimen. The cores were thereafter subjected to a crushing test to determine the crushing strength of each core, where they were laid on a flat surface and pressed perpendicularly. FIG. 3 below shows the results of the experiment.

Figure 4:
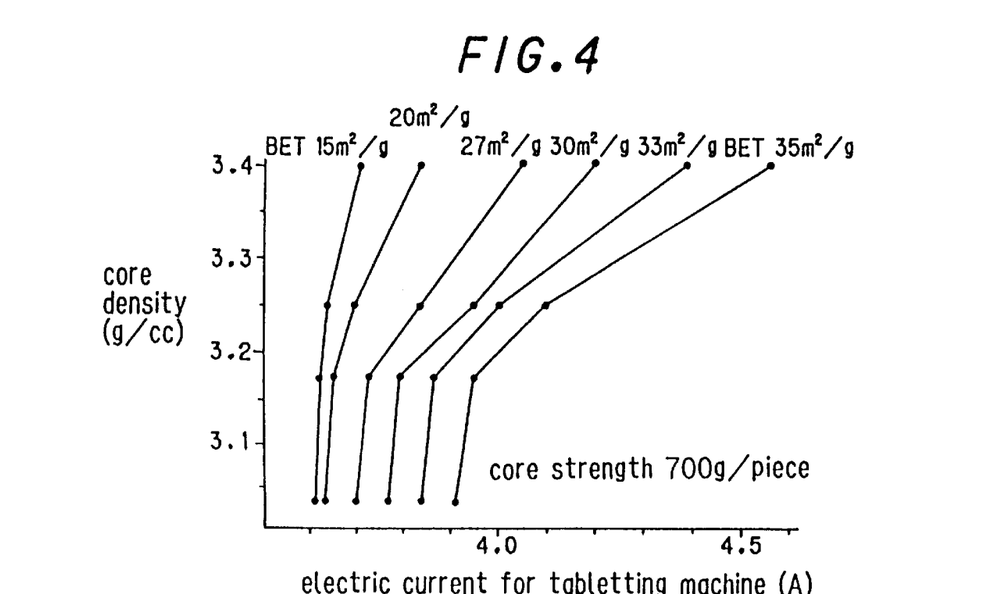
FIG. 4 is a graph showing the relationship between the intensity of the electric current used for a tabletting machine and the obtained core density for different BET values.

As seen from FIG. 3 above, the core density is conspicuously high when BET is about 30 $m^2/g$ or more, although the rate of increase in the core density becomes remarkable as BET gets to about 27 $m^2/g$. Thus, the core density of an alkaline battery can be increased by reducing the BET value of the EMD of the battery. Additionally, the lower the BET value, the greater the gap separating adjacent particles for a same core density so that the electrolytic solution of the battery is taken into the core at an enhanced rate by capillarity to improve the performance of the battery. FIG. 4 below illustrates the relationship between the intensity of the electric current used for the tabletting machine and the obtained core density for different BET values.

As seen from FIG. 4, the machine shows a low load current and experiences only a small resistance when BET is low so that it is less subjected to wear and can produce cores with an improved overall moldability including the core strength. Additionally, cores with a low BET value the rate of electrolyte adsorption.

When the EMD specimens were tested for tapping density, it showed an increase of 2.40→2.55→2.65 g/cc as the BET value falls from 35→30→25 $m^2/g$. It has been reported that the absolute density of EMD increases as the BET value falls at least within the scope envisaged for the present invention (see "Progress in Battery Materials, Vol 11 Page105(1992) IBA Sydney (Australia) Meeting") so that the results of the study on the practical molding of EMD by the inventors of the present invention agree well with the basic properties of EMD known to date.

Figure 5:
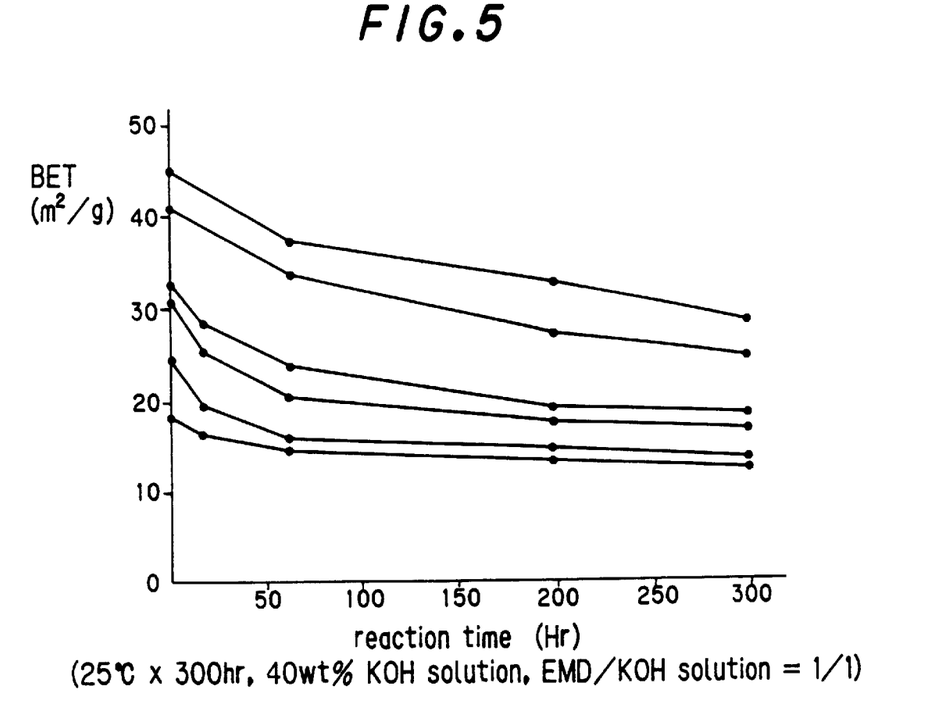
FIG. 5 is a graph showing the relationship between the alkaline reaction time and the change in the BET level for a number of EMD specimens having different initial BET values.

While the phenomenon of peptized EMD by alkali solution has been known qualitatively ("manganese dioxide and batteries" P117, 1971), no attempt has been made to quantify the suspensiveness of EMD, using aqueous solution of caustic potassium of 40 wt % as in the case of the present invention. FIG. 5 below shows the relationship between the alkaline reaction time and the change in the BET level for a number of EMD specimens having different initial BET values.

As seen from FIG. 5, specimens having an initial BET value lower than 30 $m^2/g$ showed little change in the BET when the reaction time exceeded 300 hours if compared with those having an initial BET value greater than 30 $m^2/g$ and the BET remained practically unchanged after 100 hours of reaction time.

While the reason why the BET of EMD falls when the oxide is made to react with strong caustic solution containing, for example, KOH by as high as 40 wt % is not known to date, it is quite likely that the fall in the BET level is correlated to the potassium concentration. In a study carried out by the inventors of the present invention, it was found that EMD with a lower BET level generates gas less than EMD with a higher BET level when caused to react with KOH solution if the impurity level (particularly of heavy metals) is the same in both cases. So, the fall in the BET level may be correlated with the amount of gas generated by the reaction of EMD and alkaline solution during storage.

Anyway, the above discussion on the properties of alkaline batteries suggests that the use of EMD having a low BET level is advantageous particularly if batteries as used in cold or tropical areas where, it is believed, the EMD contained in the batteries is particularly susceptible to deterioration because EMD with a low BET value can withstand deterioration by alkali.

While no established theory has been known to date explaining the phenomenon of peptized EMD by alkali, it may be attributable to the exchange of K-ions and H-ions that takes place within the battery. Another possible speculation is that the battery may contain wet gelled portions where EMD is poorly crystallized because of the strong dehydrating effect of strong alkali and/or the effect of peptized EMD and the EMD in such portions are deteriorated under the effect of strong alkali or reacts with eluted bivalent manganese, although these and other speculations are to be examined in future studies.

Then, the inventors of the present invention determined the conditions under which the BET and the suspensiveness of EMD falls below 30 $m^2/g$ and 50 mg/liter, respectively by carrying out a number of experiments. The inventors reported earlier (Japanese Patent Publication No. 63-26389) that the smaller the anodic current density, the particle size of suspended manganese dioxide and the rate of adding manganese dioxide, the lower the BET level of manganese dioxide or that the BET level is held low under conditions where the electrolytic voltage can hardly rise when tested at 95° C. with a sulfuric acid concentration of 0.4 mol/liter.

Figure 6:
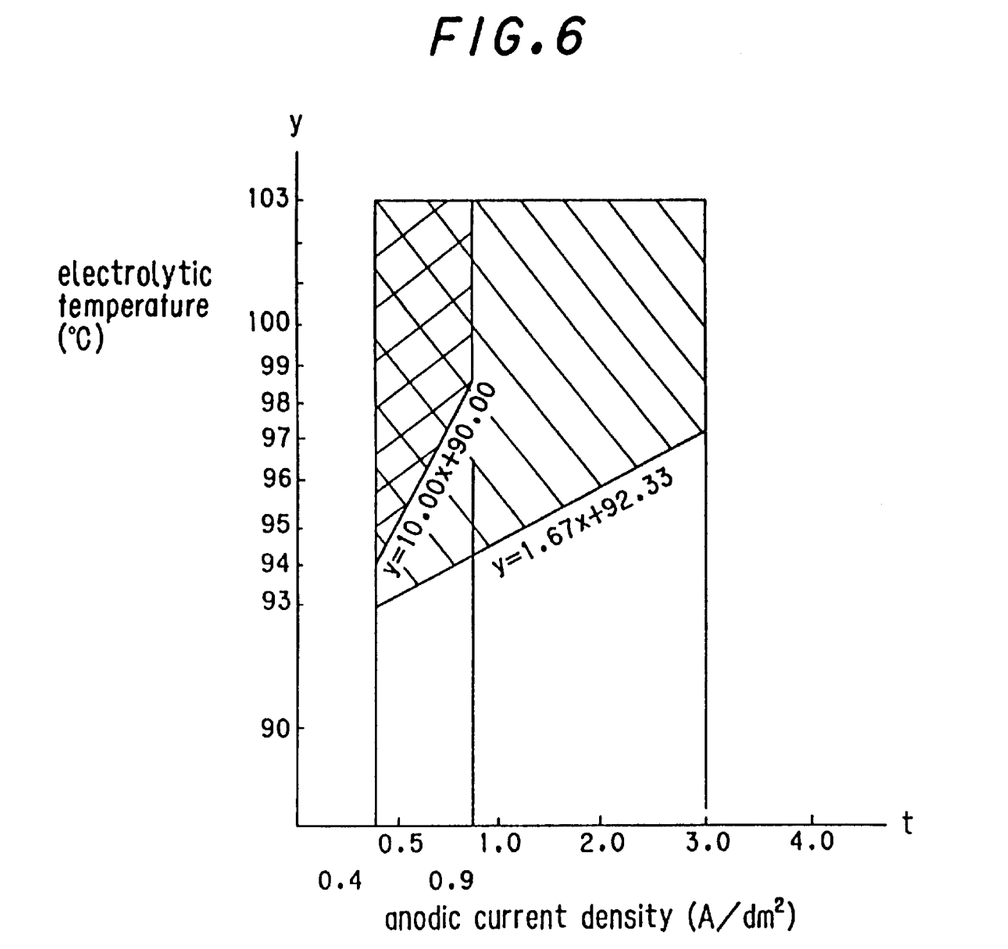
FIG. 6 is a graph showing the relationship between the anodic current density and the electrolytic temperature for EMD with a BET level of 30 m$^2$/g or less and a suspensiveness of 50 mg/liter or less according to the invention.

Thereafter, the inventors came to realize that the rise in the electrolytic voltage is largely affected by the electrolytic temperature of the reaction system and carried out a number of experiments, paying particular attention to the electrolytic temperature. While there are some reports that the BET level falls with a decrease in the anodic current intensity and a rise in the electrolytic temperature, the electrolytic temperature was raised to an unprecedented level (higher than 98° C.) in the experiments. Since no reports had been made on the suspensiveness and the electrolytic conditions for producing EMD, the inventors also paid particular efforts in determining their effects in the experiments. FIG. 6 shows some of the obtained results of the experiments.

FIG. 6 shows the relationship between the anodic current density and the electrolytic temperature when EMD was prepared with a BET level of 30 m²/g or less and a suspensiveness of 50 mg/liter or less by means of the clarification method and the slurry method. As will be described further hereinafter by referring to examples, it was found that EMD that meets the requirements of the present invention can be produced by selecting a combination of the electrolytic temperature and the anodic current density found in the shaded area of FIG. 6 whose bottom line is defined by equation y=1.67x+92.99 for the suspension method and by equation y=10.00x+90.00 for the clarification method. Obviously, it is impossible to conduct an operation of electrolysis at temperature above 103° C. which is very close to the boiling point of the electrolytic solution to be used for the operation. Note that the above equations are subject to a limit of error of 1.0° C. Also note that the relationships of FIG. 6 are applicable to a variable load method Japanese Patent Application No. 5-275054) proposed by the inventors of the present invention within the shaded area of FIG. 6.

Figure 7:
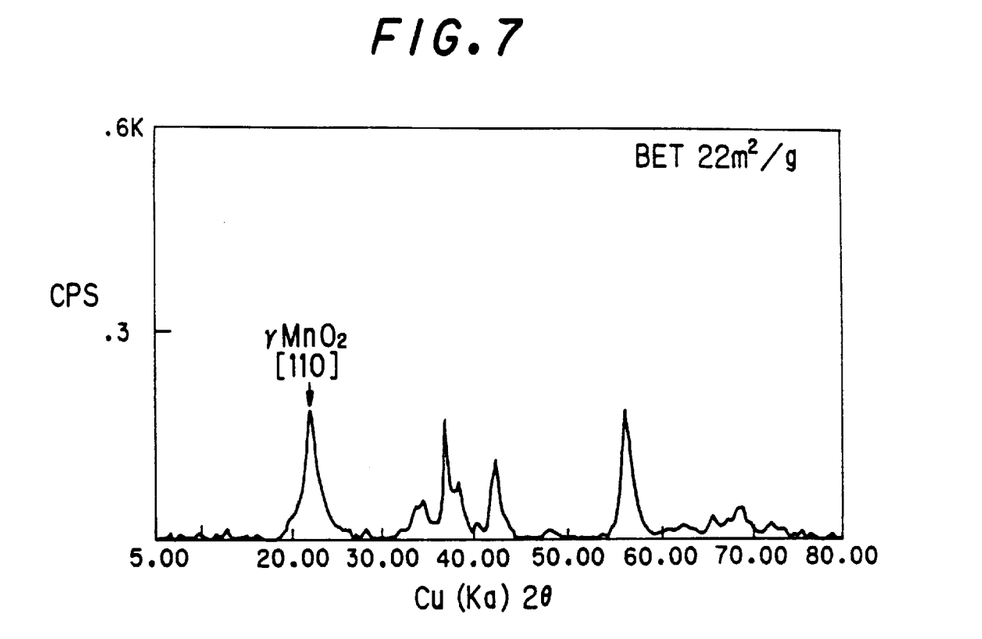
FIG. 7 is an X-ray diffraction diagram of a sample EMD according to the invention.
Figure 8:
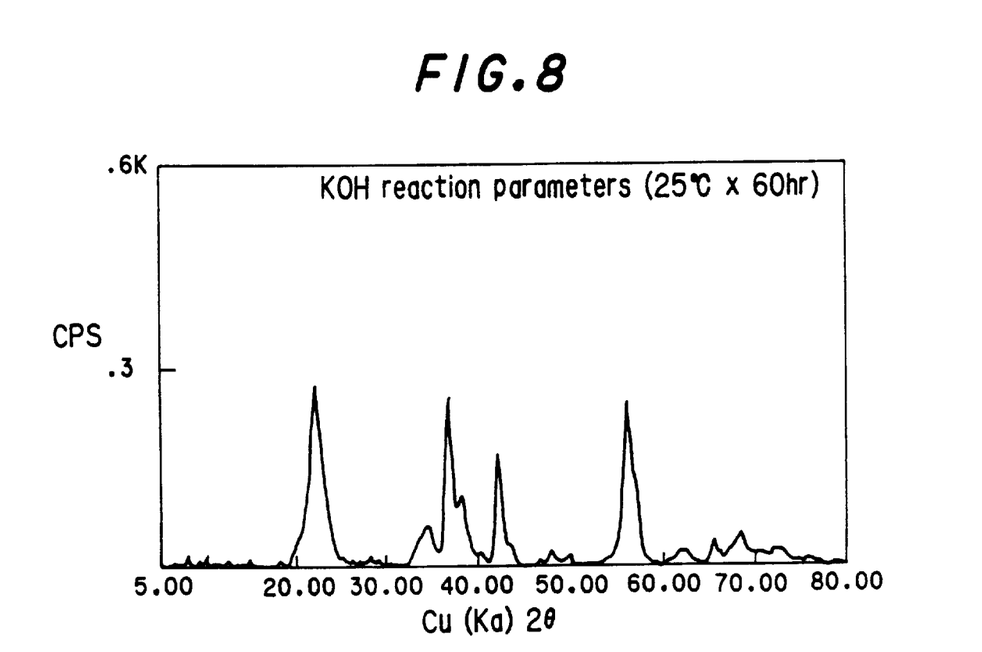
FIG. 8 is an X-ray diffraction diagram of the sample FIG. 7 after subjecting it to a reaction with 40 wt % KOH solution.
Figure 9:
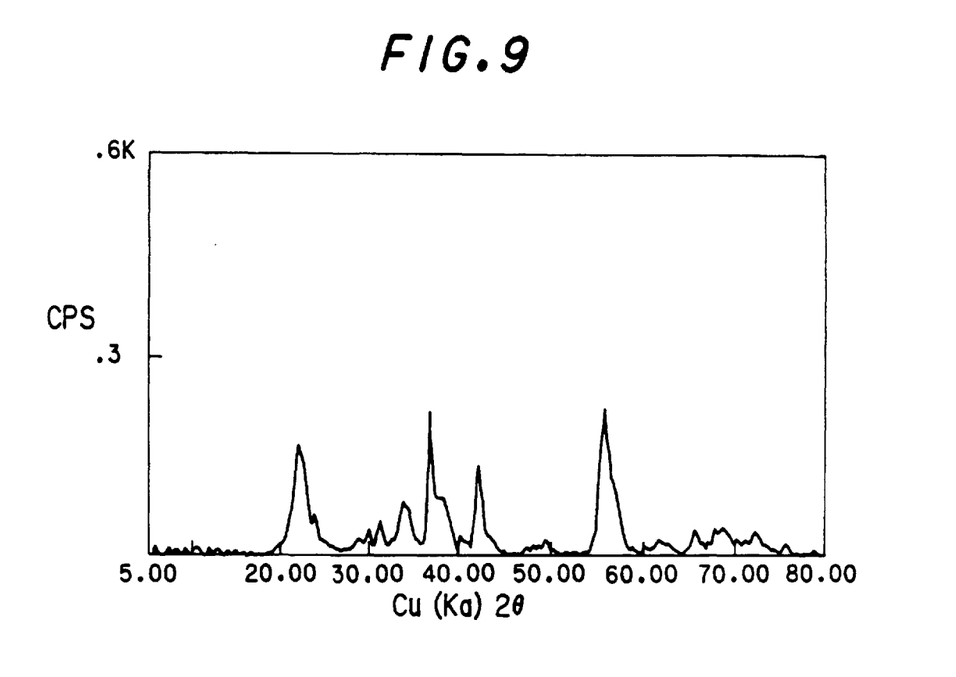
FIG. 9 is an X-ray diffraction diagram of the sample of FIG. 8 collected after passing it through a paper filter.
Figure 10:
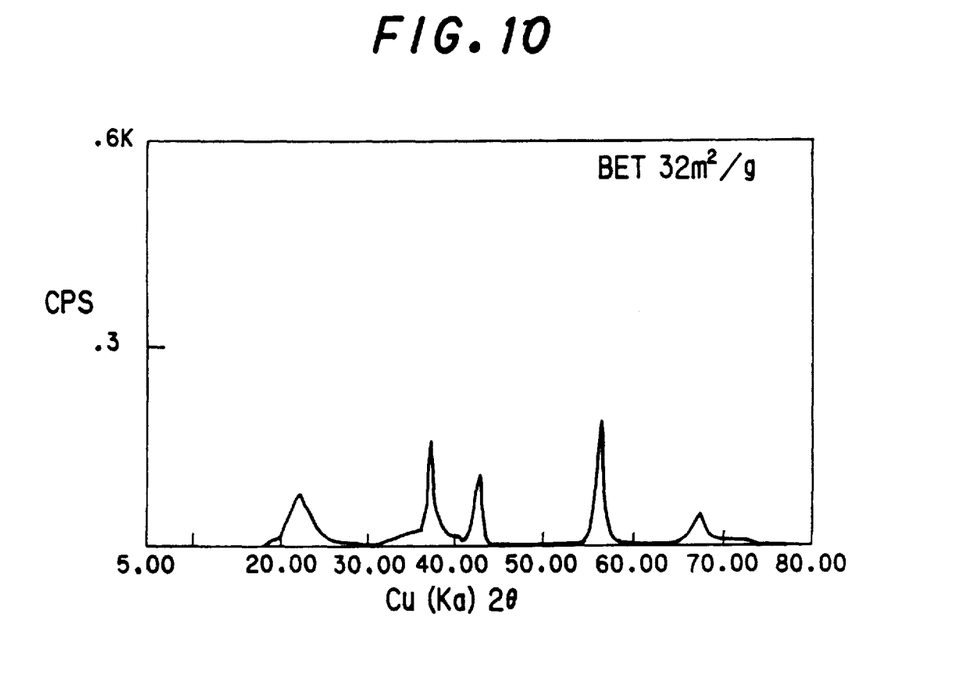
FIG. 10 is an X-ray diffraction diagram of a sample of conventional EMD.

FIG. 7 is an X-ray diffraction diagram of a sample EMD and FIG. 8 is a corresponding X-ray diffraction diagram of the sample of FIG. 7 after subjecting it to a reaction with 40 wt % KOH solution. Whereas, FIG. 9 is a corresponding X-ray diffraction diagram of the sample of FIG. 8 collected after passing it through a paper filter and FIG. 10 is an X-ray diffraction diagram of a sample of conventional EMD.

From the above X-ray diffraction diagrams, it is seen that EMD with a low BET level according to the invention (FIG. 7) shows sharp peaks in the diagram to prove its excellent crystallinity when compared with conventional EMD having an ordinary BET level of 32 m²/g (FIG. 10) and that the peak of the lattice plane of γ-MnO₂[110] is particularly sharp for the specimen of EMD according to the invention. After the reaction with KOH solution, the crystallinity of the specimen was further improved (FIG. 8), although the crystallinity was not so excellent for fine particles that had passed through a paper filter (FIG. 9). Note that the these tendencies are particularly remarkable as the BET level rises. This may suggest that poorly crystalline portions of the original EMD specimen may have been separated from the remaining portions of the specimen in the course of filtration.

It was found through an operation of fluorescent X-ray analysis that the fine particles that had passed through a paper filter contained potassium although they are mainly made of manganese.

It may be safe to conclude from the results of the above described X-ray diffraction analysis that EMD with a low BET level according to the invention has an excellent crystallinity and crystal lattices are neatly arranged therein to provide advantageous conditions for the dispersion and movement of hydrogen ions (H⁺) and electrons (e⁻). In short, EMD with a low BET level according to the invention can provide, if used correctly, an excellent material for batteries that are remarkable both in the initial performance and the storability in the field of alkaline batteries in general and that of manganese batteries in particular that will be designed mainly for low load discharge in the near future.

Figure 11:
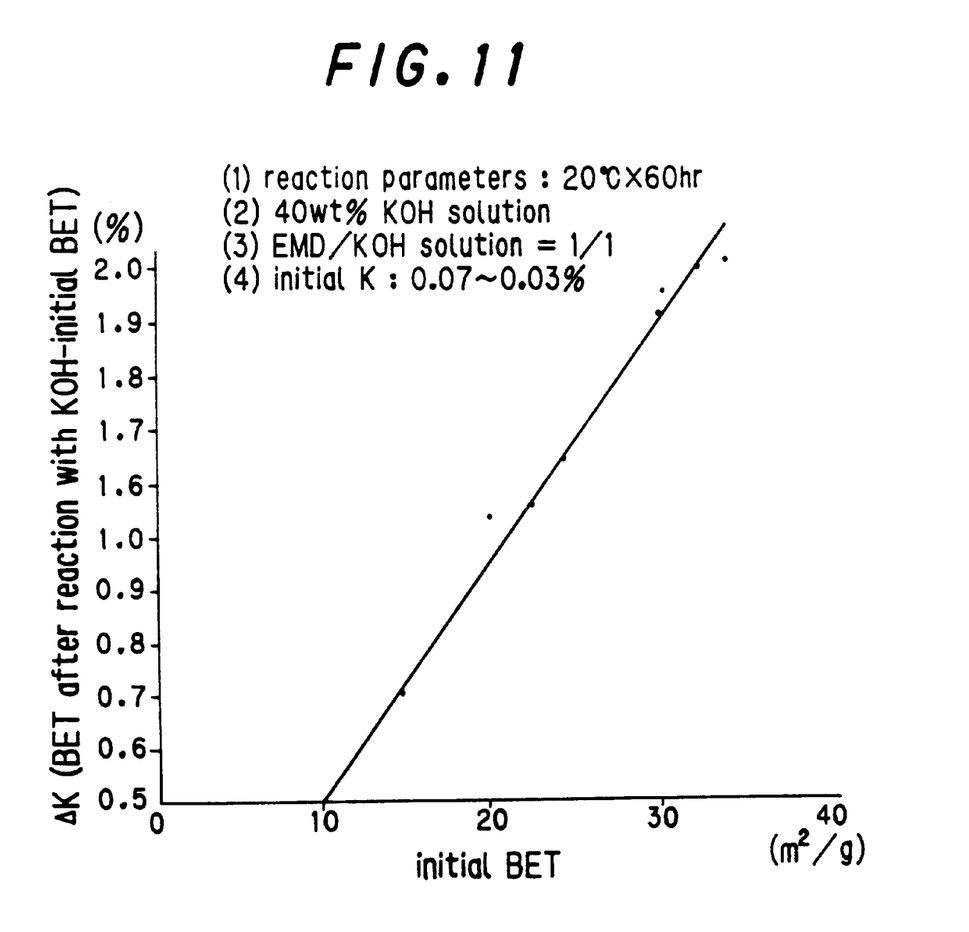
FIG. 11 is a graph showing the linear relationship between the change in the BET level before and after the alkaline reaction of EMD according to the invention and the potassium adsorption rate.

While some studies have been made on potassium adsorption (e.g., Periodical "Hyomen (Surface)", Vol. 26, No. 6;376 1988), the inventors of the present invention found that the change in the BET level before and after the reaction of EMD with alkaline solution containing KOH to a high concentration of 40 wt % is proportional to the potassium adsorption rate. FIG. 11 illustrates this linear relationship.

According to the findings of the inventors of the present invention, potassium is not particularly adsorbed to the surface of EMD particles in a concentrated manner as has been widely believed but evenly distributed in the inside of the structure of crystal. Such a phenomenon of intrusion of potassium into the inside of the crystalline structure may represents degradation of EMD by alkaline solution. A study on the potassium adsorption and other characteristic aspects of the electric discharge of alkaline batteries (Periodical "Denki Kagaku and Kogyo Buturi Kagaku (Electrochemistry and Industrial Physical Chemistry) 62-No. 9,792 1994) describes an observation that batteries operate advantageously if they are immune from potassium intrusion and agrees with the corresponding findings of the inventors of the present invention.

Now, the present invention will be described further by way of examples.

EXAMPLE 1

A manganese sulfate solution is poured in a continuous operation into an electrolytic bath (10 m³) provided with an anode of a titanium plate and a cathode of a black carbon plate. The manganese concentration of the solution in the electrolytic bath was regulated to between 0.5 and 1.0 mol/liter. Then, Specimens (1) through (12) were prepared with parameters as shown in Table 1.

Any electrodeposits were peeled off by means of an ordinary after-treatment technique. When the particle size was regulated to be between 40 and 45 μm for the specimens used for alkaline batteries and between 20 and 25 μm for those used for manganese batteries under same electrolytic conditions, no significant difference was observed among the specimens in terms of both BET and suspensiveness. As for the specimens used for alkaline batteries, those having a relatively small suspensiveness showed a relatively high alkaline initial potential (relative to Hg/HgO). Specimens (5) through (10) representing the present invention were satisfactory in terms of both BET and suspensiveness.

EXAMPLE 2

Mercury-free alkaline LR6 batteries and mercury-free ZnCl₂ manganese R20 batteries were prepared by using the specimens of Table 1 and tested for initial performance and storability. Table 2 shows the test results.

The numerical values in Table 2 are those relative to the corresponding values of Specimen (4) having a BET level of 30 m²/g that are expressed as equal to 100. The prepared alkaline batteries were filled with EMD to predetermined respective volumes under a predetermined filling pressure such that they reflected the differences in the effectiveness of filling among them. Specifically speaking, the volumes of EMD were 96 for (1) and (2), 100 for (3), 105 for (5) through (8) and (11), 107 for (9) and (10) and 100 for (12) if (4) had a reference value of 100. As for the prepared manganese batteries on the other hand, they were filled with EMD always to show a same volume and a same weight of filling.

The storability is expressed in terms of the potential relative to the initial potential which is expressed by 100.

As seen from Table 2, the alkaline batteries realized by using specimens (5) to (10) showed an improved initial performance due to the increase in the weight of EMD and an improved storability due to the decrease in the suspensiveness. As for the manganese batteries prepared by using the specimens showed an improvement in the initial performance on a low load status and also an improved storability.

EXAMPLE 3

Mercury-free $ZnCl_2$ manganese R20 batteries were prepared by filling them with respective specimens to increased volumes under a predetermined filling pressure. Table 3 shows the obtained results. More specifically, the volumes of EMD were 98 for (2), 105 for (6) and (8) and 107 for (10) if (4) had a reference value of 100. The storability of each of the batteries was also improved as in the case of Table 2. It is seen from Table 3 that batteries using EMD with a low BET value are excellent both in the initial performance and in the storability on a low load status.

EXAMPLE 4

Alkaline LR20 batteries were prepared by using Specimens (4) and (9) and subsequently subjected to a series of charging/discharging tests on 2Q-continuous (for initial performance), 20Q-continuous (for initial performance) and 2Q-continuous (after storage at 70° C. for 30 days) bases. Table 4 shows the results of the tests. The observed discharge performances were expressed as 100 for each test. It is clearly seen that the batteries with Specimen (9) having a low BET level behaved better than those with Specimen (4). In each test, the discharge was suspended when the voltage dropped to 1.0V and resumed when the voltage was raised back to 1.55V.

(Advantages of the invention)

As described in detail above, electrolytic manganese dioxide according to the invention can be used to provide alkaline and manganese batteries that are excellent both in the initial performance and the storability as it has a BET level lower than 30 $m^2/g$ and a suspensiveness of less than 50 mg/liter and is less subject to degradation by alkali.

Additionally, the fact that EMD with a low BET level according to the invention is excellent in storability and practically free from degradation during storage makes it particularly suited for use in manganese and alkaline batteries designed for emergency applications in natural disasters such as earthquakes fires.

Since a method of manufacturing electrolytic manganese dioxide according to the invention is based on a finding on a given relationship between the current density and the reaction temperature for electrolysis, beth a low BET level and a low suspensiveness can be achieved for electrolytic manganese dioxide if the conventional clarification method or the suspension method are employed. Additionally, since a high current density can be achieved for electrolytic manganese dioxide if it has a low BET level, a method of manufacturing electrolytic manganese dioxide according to the invention can provide a high yield if it is used on an industrial basis. Still additionally, amethod of manufacturing electrolytic manganese dioxide according to the invention is advantages when it is used with the variable load method or alternately with the clarification method and the suspension method.

TABLE 1

| | electrolytic conditions | | | | | EMD characteristics (for alkaline batteries) | | |
|---|---|---|---|---|---|---|---|---|
| No. | current density $A/dm^2$ | electrolytic temperature ° C. | bath sulfuric acid concent. mol/liter | manganese dioxide particle diameter μm | manganese dioxide rate of ad. g/liter | BET $m^2/g$ | suspensiveness mg/liter | alkaline initial potential (re. Hg/HgO) mV |
| (1)*1 | 0.8 | 93 | 0.45 | — | — | 38 | 40 | 245 |
| (2)*2 | 2.5 | 95 | 0.45 | 0.17 | 0.3 | 34 | 70 | 240 |
| (3)*1 | 1.8 | 95 | 0.40 | 7.0 | 0.3 | 32 | 65 | 250 |
| (4)*1 | 0.8 | 95 | 0.45 | — | — | 30 | 80 | 255 |
| (5) | 2.0 | 98 | 0.40 | 4.0 | 0.15 | 29 | 45 | 260 |
| (6) | 0.9 | 103 | 0.45 | — | — | 28 | 30 | 265 |
| (7) | 1.6 | 97 | 0.40 | 2.0 | 0.05 | 25 | 15 | 263 |
| (8) | 1.0 | 95 | 0.50 | 1.0 | 0.10 | 24 | 15 | 270 |
| (9) | 1.6 | 97 | 0.40 | 1.0 | 0.20 | 18 | 8 | 260 |
| (10)*3 | 2.0 | 98 | 0.40 | 4.0 | 0.15 | 15 | 5 | 265 |
| | 0.4 | 103 | 0.45 | — | — | | | |
| | (average current density - 1.33) | | | | | | | |
| (11)*1 | 1.6 | 95 | 0.40 | 0.17 | 0.3 | 24.5 | 55 | 255 |
| (12)*1 | 1.6 | 95 | 0.40 | 7.0 | 0.3 | 30 | 70 | 248 |

N.B. *1: electrolysis by a conventional method
*2: electrolysis by a method according to Japanese Patent Publication No. 63-26389
*3: electrolysis by a method according to the invention, using a variable load (2.0 $A/dm^2$ × 14 hr + 0.4 $a/dm^2$ × 10 hr)

TABLE 2

| | | | alkaline U3 performance indexes | | | | | | ZnCl₂ manganese U1 performance indexes | | | | |
| | | | | | | after storage | | | initial | | after storage (60° C. × 20 days) | | |
| | | | | initial | | (60° C. × 20 days) | | | | 20Ω | | | 20Ω |
| No. | BET m²/g | suspensive-ness mg/liter | 20Ω cont. | 10Ω cont. | 75Ω cont. | 2Ω cont. | 10Ω cont. | 75Ω cont. | 4Ω cont. | 20Ω cont. | cont. 4 hr/d | 4Ω cont. | 20Ω cont. | cont. 4 hr/d |
|---|---|---|---|---|---|---|---|---|---|---|---|---|---|---|
| (1) | 38 | 40 | 95 | 98 | 99 | 80 | 93 | 96 | 95 | 97 | 98 | 74 | 90 | 92 |
| (2) | 34 | 70 | 95 | 98 | 99 | 71 | 85 | 87 | 96 | 98 | 99 | 68 | 84 | 85 |
| (3) | 32 | 65 | 97 | 99 | 100 | 73 | 87 | 89 | 99 | 99 | 99 | 74 | 86 | 88 |
| (4) | 30 | 80 | 100 | 100 | 100 | 75 | 90 | 92 | 100 | 100 | 100 | 73 | 85 | 88 |
| (5) | 29 | 45 | 103 | 104 | 105 | 83 | 95 | 98 | 100 | 103 | 105 | 75 | 90 | 92 |
| (6) | 28 | 30 | 104 | 105 | 105 | 85 | 97 | 99 | 103 | 105 | 108 | 79 | 90 | 96 |
| (7) | 25 | 15 | 104 | 105 | 105 | 85 | 98 | 99 | 103 | 105 | 110 | 85 | 92 | 97 |
| (8) | 24 | 15 | 104 | 105 | 105 | 87 | 99 | 99 | 103 | 105 | 110 | 85 | 92 | 97 |
| (9) | 18 | 8 | 105 | 106 | 107 | 95 | 99 | 99 | 102 | 103 | 109 | 86 | 93 | 98 |
| (10) | 15 | 5 | 105 | 106 | 107 | 94 | 99 | 99 | 102 | 103 | 109 | 87 | 93 | 98 |
| (11) | 24.5 | 55 | 103 | 102 | 103 | 80 | 92 | 93 | 101 | 101 | 102 | 73 | 86 | 90 |
| (12) | 30 | 70 | 100 | 100 | 101 | 80 | 90 | 93 | 100 | 101 | 102 | 74 | 85 | 88 |

TABLE 3

| | | ZnCl₂ manganese R20 battery performance indexes | | | | | |
| | | initial | | | after storage (60° C. × 20 days) | | 20Ω |
| No. | BET | 4Ω cont. | 20Ω cont. | 20Ω cont. | 4Ω cont. | 20Ω cont. | cont. 4 hr/day |
|---|---|---|---|---|---|---|---|
| (2) | 34 | 96 | 98 | 99 | 68 | 84 | 85 |
| (4) | 30 | 100 | 100 | 100 | 73 | 85 | 88 |
| (6) | 28 | 104 | 107 | 108 | 80 | 92 | 97 |
| (8) | 24 | 105 | 107 | 108 | 86 | 93 | 97 |
| (10) | 15 | 105 | 108 | 109 | 90 | 95 | 98 |

TABLE 4

| | No. 4 (BET 30 m²/g, suspensiveness 80 mg/liter) | | | No. 9 (BET 18 m²/g, suspensiveness 8 mg/liter) | | |
| No. of cycles | 2Ω cont. | 20Ω cont. | 2Ω cont. (stor.) | 2Ω cont. | 20Ω cont. | 2Ω cont. (stor.) |
|---|---|---|---|---|---|---|
| 1 | 100 | 100 | 100 | 100 | 100 | 100 |
| 2 | 80 | 82 | 75 | 95 | 96 | 92 |
| 3 | 75 | 79 | 70 | 90 | 93 | 86 |
| 4 | 62 | 70 | 55 | 85 | 88 | 81 |
| 5 | 45 | 65 | 51 | 83 | 85 | 80 |
| 6 | 40 | 60 | 32 | 82 | 84 | 78 |
| 7 | — | — | — | 79 | 82 | 76 |

TABLE 4-continued

| | No. 4 (BET 30 m²/g, suspensiveness 80 mg/liter) | | | No. 9 (BET 18 m²/g, suspensiveness 8 mg/liter) | | |
| No. of cycles | 2Ω cont. | 20Ω cont. | 2Ω cont. (stor.) | 2Ω cont. | 20Ω cont. | 2Ω cont. (stor.) |
|---|---|---|---|---|---|---|
| 8 | — | — | — | 77 | 80 | 74 |
| 9 | — | — | — | 65 | 77 | 61 |
| 10 | — | — | — | 63 | 76 | 57 |
| 11 | — | — | — | 60 | 75 | 53 |

What is claimed is:

1. An electrolytic manganese dioxide having a BET specific surface area (surface area measured by the Brunauer, Emmet and Teller method of less than 30 m²/g and a density of fine particles eluted, when heating and stirring electrolyzed manganese dioxide in alkaline solution, of less than 50 mg/liter.

2. The electrolytic manganese dioxide according to claim 1, wherein the BET specific surface area is less than 27 m²/g.

3. The electrolytic manganese dioxide according to claim 1, wherein said electrolytic manganese dioxide contains potassium.

4. The electrolytic manganese dioxide according to claim 1, wherein the electrolytic manganese dioxide has an average particle diameter of between 15 μm and 50 μm.

* * * * *